US009019148B1

(12) United States Patent
Bikhazi et al.

(10) Patent No.: US 9,019,148 B1
(45) Date of Patent: Apr. 28, 2015

(54) REMOTE SENSING USING MIMO SYSTEMS (75) Inventors: Nicolas Bikhazi, Albuquerque, NM (US); William F. Young, Boulder, CO (US); Hung D. Nguyen, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 511 days.

(21) Appl. No.: 13/454,802

(22) Filed: Apr. 24, 2012

(51) Int. Cl.
*G01S 13/00* (2006.01)
*G01S 7/41* (2006.01)
*G01S 13/56* (2006.01)
*G01S 13/04* (2006.01)
*H04B 7/06* (2006.01)
*H04B 7/04* (2006.01)

(52) U.S. Cl.
CPC . *G01S 7/41* (2013.01); *G01S 7/411* (2013.01); *G01S 13/56* (2013.01); *G01S 13/04* (2013.01); *G01S 7/412* (2013.01); *H04B 7/0617* (2013.01); *H04B 7/0413* (2013.01)

(58) Field of Classification Search
CPC .......... G01S 7/41–7/412; G01S 13/00; G01S 13/04; G01S 13/56; H04B 1/44; H04B 10/11; H04B 7/0617; H04B 7/0413
USPC ............... 342/22, 27, 28, 104, 107, 109, 113, 342/118, 146, 175
See application file for complete search history.

(56) References Cited

U.S. PATENT DOCUMENTS

| 5,216,640 | A * | 6/1993 | Donald et al. | 367/124 |
|---|---|---|---|---|
| 6,091,361 | A * | 7/2000 | Davis et al. | 342/378 |
| 6,724,340 | B1 * | 4/2004 | Carlos et al. | 342/22 |
| 7,978,120 | B2 * | 7/2011 | Longstaff | 342/22 |
| 7,994,965 | B2 * | 8/2011 | Longstaff | 342/59 |
| 8,289,203 | B2 * | 10/2012 | Culkin et al. | 342/73 |
| 8,299,958 | B2 * | 10/2012 | Kemkemian et al. | 342/107 |
| 8,350,749 | B1 * | 1/2013 | Malas et al. | 342/90 |
| 8,570,210 | B1 * | 10/2013 | Fonder et al. | 342/25 B |
| 8,730,095 | B1 * | 5/2014 | Volman et al. | 342/153 |
| 2005/0083199 | A1 * | 4/2005 | Hall et al. | 340/552 |
| 2009/0046003 | A1 * | 2/2009 | Tung et al. | 342/174 |
| 2009/0237294 | A1 * | 9/2009 | Shoji et al. | 342/159 |
| 2010/0164784 | A1 * | 7/2010 | Longstaff | 342/202 |
| 2010/0178884 | A1 * | 7/2010 | Nassiri-Toussi et al. | 455/101 |

(Continued)

OTHER PUBLICATIONS

Bikhazi, Nicolas et al. "Sensing using Eigenchannels in Radio-Frequency Multiple-Input, Multiple-Output Communication Systems", Wireless Sensing, Localization, and Processing VI, Proc. SPIE 8061, 80610O, Apr. 28, 2011, 6 pages.

(Continued)

*Primary Examiner* — Peter Bythrow
(74) *Attorney, Agent, or Firm* — Michael A. Beckett (57) ABSTRACT

A technique for sensing a moving object within a physical environment using a MIMO communication link includes generating a channel matrix based upon channel state information of the MIMO communication link. The physical environment operates as a communication medium through which communication signals of the MIMO communication link propagate between a transmitter and a receiver. A spatial information variable is generated for the MIMO communication link based on the channel matrix. The spatial information variable includes spatial information about the moving object within the physical environment. A signature for the moving object is generated based on values of the spatial information variable accumulated over time. The moving object is identified based upon the signature.

22 Claims, 5 Drawing Sheets

(56) References Cited

U.S. PATENT DOCUMENTS

| | | | |
|---|---|---|---|
| 2010/0207804 A1* | 8/2010 | Hayward et al. | 342/28 |
| 2010/0220001 A1* | 9/2010 | Longstaff | 342/22 |
| 2010/0292568 A1* | 11/2010 | Droitcour et al. | 600/425 |
| 2011/0013716 A1* | 1/2011 | Brodzik et al. | 375/295 |
| 2011/0044193 A1* | 2/2011 | Forenza et al. | 370/252 |
| 2012/0274499 A1* | 11/2012 | Chang | 342/107 |
| 2012/0306684 A1* | 12/2012 | Shoji | 342/107 |
| 2013/0113652 A1* | 5/2013 | Smits et al. | 342/174 |

OTHER PUBLICATIONS

Channel state information, Wikipedia, retrieved from Internet on Apr. 18, 2012, <http://en.wikipedia.org/wiki/Channel_state_information>, 4 pages.

Multistatic radar, Wikipedia, retrieved from Internet on Apr. 18, 2012, < http://en.wikipedia.org/wiki/Multistatic_radar >, 5 pages.

MIMO, Wikipedia, retrieved from Internet on Apr. 18, 2012, < http://en.wikipedia.org/wiki/MIMO >, 5 pages.

Bliss, D.W. et al., "Multiple-input multiple-output (MIMO) radar and imaging: degrees of freedom and resolution", Conference Record of the Thirty-Seventh Asilomar Conference on Signals, Systems and Computers, pp. 54-59, Nov. 2003.

Chernyak, V.S., "MIMO radars. What are they?", 2010 European Radar Conference (EuRAD), pp. 137-140, Sep. 2010.

Donnet, B.J. et al., "Combining MIMO Radar with OFDM Communications", EuRAD 2006: $3^{rd}$ European Radar Conference, pp. 37-40, Sep. 2006.

Shingu, G. et al.,"Human Body Detection Using MIMO-UWB Radar Sensor Network in an Indoor Environment", PDCAT 2008. Ninth International Conference on Parallel and Distributed Computing, Applications and Technologies, pp. 437-442, Dec. 2008.

Deiana, D. et al., "Multipath exploitation in an urban environment using a MIMO surveillance radar", 2010 11th International Radar Symposium (IRS), pp. 1-4, Jun. 2010.

Lane, R.O. et al., "Detecting personnel in wooded areas using MIMO radar", IET International Conference on Radar Systems, 2007, pp. 1-5, Oct. 2007.

Boudamouz, B. et al., "Through the wall MIMO radar detection with stepped frequency waveforms", 2010 European Radar Conference (EuRAD), pp. 400-402, Sep. 2010.

Goldsmith, A., et al., "Capacity limits of MIMO channels," IEEE Journal on Selected Areas in Communications, vol. 21, Issue 5, pp. 684-702, Jun. 2003.

IEEE 802.11n, <http://standards.ieee.org/getieee802/downioad/802.11n-2009.pdf>, 536 pages, Oct. 2009.

* cited by examiner

REMOTE SENSING USING MIMO SYSTEMS

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to multiple-input and multiple-output communication technology and remote sensing.

BACKGROUND INFORMATION

Multiple-input, multiple-output ("MIMO") refers to a technology that uses multiple antennas at the transmitter or receiver to improve communication performance. In wireless communications, MIMO technology can provide improved throughput and link range for a given bandwidth and transmit power. MIMO achieves these improvements by intelligently balancing the total transmit power over the multiple antennas. MIMO technology is used in various wireless communication standards including IEEE 802.11n (Wifi), 4G cellular communications, 3rd Generation Partnership Project Long Term Evolution, and WiMAX, to name a few. MIMO use three different techniques to increase throughput and link range: precoding (beamforming), spatial multiplexing, and diversity coding. Beamforming uses phase and/or gain weights applied to the signal transmitted from each antenna at the transmitter to maximize the signal received at the receiver. Spatial multiplexing uses a high rate signal split into multiple lower rate streams with each stream transmitted over a different spatial channel resulting from the spatial offset between the multiple antennas. Diversity coding applies space-time coding to a single data stream. MIMO technology has been applied to radar systems. However, MIMO radar operates using the same fundamental principle as traditional radar, which interrogates a specific physical region via a pulsed RF waveform and analyzes the reflected pulse to remote wirelessly sense the presence of an object within the physical region.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system and method for multi-input and multiple-output ("MIMO") remote sensing to obtain spatial information about an object within the physical environment of the MIMO communication link are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
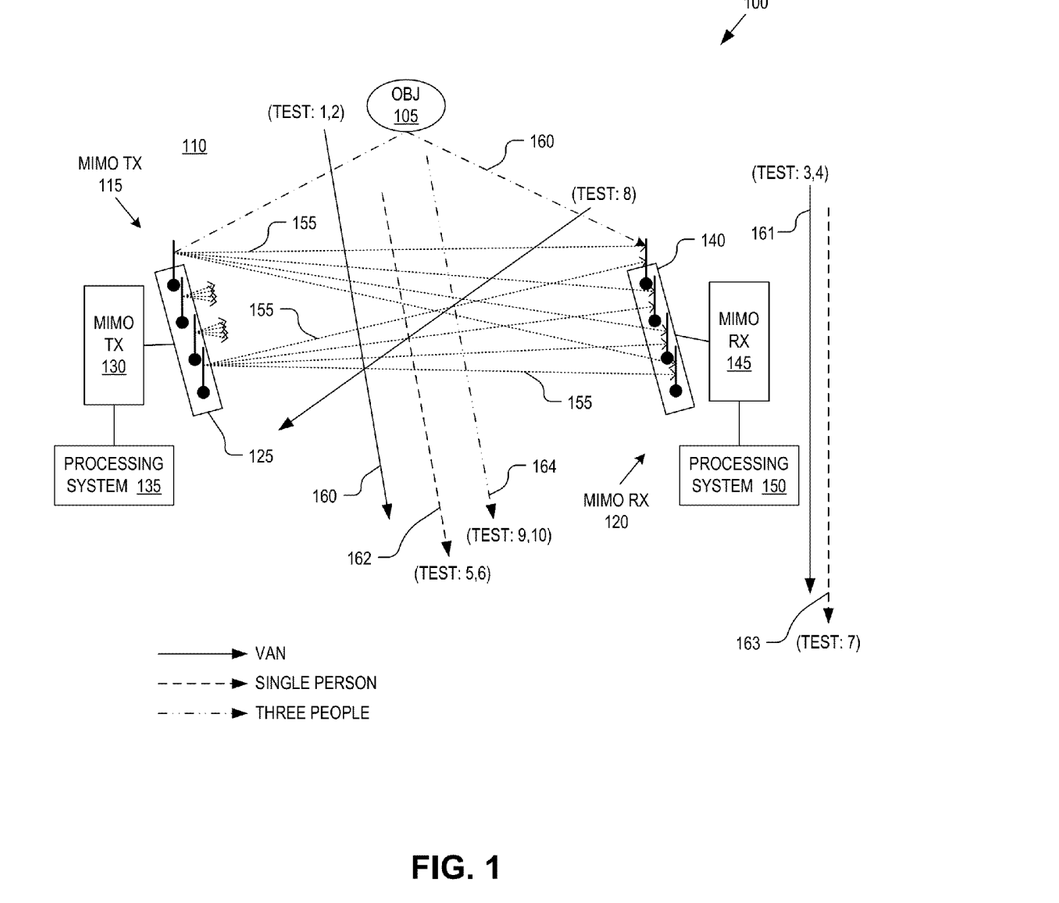
FIG. 1 is a diagram illustrating a MIMO communication system configured to perform remote sensing, in accordance with an embodiment of the disclosure.

FIG. 1 is a diagram illustrating a MIMO communication system 100 configured to perform remote sensing of an object 105 within a physical environment 110, in accordance with an embodiment of the disclosure. The illustrated embodiment of MIMO communication system 100 includes a MIMO transmitter ("TX") 115 and a MIMO receiver ("RX") 120. The illustrated embodiment of MIMO TX 115 includes an antenna array 125, MIMO transmitter circuitry 130, and a processing system 135. The illustrated embodiment of MIMO RX 120 includes an antenna array 140, MIMO receiver circuitry 145, and a processing system 150. Although FIG. 1 illustrates one-way communications between a transmitter and receiver, it should be appreciated that embodiments of the present invention are equally applicable for use with bi-directional transceivers, in which case, MIMO TX 115 would include additional receiver circuitry and MIMO RX 120 would include additional transmitter circuitry.

The techniques disclosed herein use the spatial characteristics of MIMO communication technology to remotely sense or identify object 105 within physical environment 110. This MIMO remote sensing technique operates differently than MIMO radar. MIMO radar interrogates a specific physical region via a pulsed RF waveform and analyzes the reflected pulses to remote sense the presence of an object within the physical region. In contrast, embodiments of the disclosed technique treat the physical environment 110 as a communication medium through which communication signals 155 propagate between MIMO transmitter 115 and MIMO receiver 120. Communication signals 115 represent different spatial communication channels between MIMO transmitter 115 and MIMO receiver 120 that collectively establish a MIMO communication link between the transmitter and the receiver. As object 105 moves into physical environment 110, it perturbs the spatial communication channels by creating one or more new spatial communication channels (e.g., spatial communication channel 160), attenuating one or more existing spatial communication channels, or enhancing one or more existing communication channels. In essence, object 105 becomes part of the communication medium.

The channel perturbations can be measured via appropriate analysis of the channel state information or channel matrix associated with the MIMO communication link. Since the individual spatial communication channels of a MIMO communication link are spatially distinct or propagate along different spatial paths, spatial information variables can be derived from the channel matrix. The spatial information variables can be used to generate signatures that contain spatial information about object 105 moving through physical environment 110. For example, the signatures may be distinctively related to the size, shape, and/or matter composition distribution of object 105. In the case of an RF antenna array, the matter composition distribution of object 105 may be indirectly sensed, since the spatial distribution of RF absorptive material versus RF reflective material versus RF transparent material will appear in the signatures generated based upon the spatial information variables.

Embodiments of antenna arrays 125 and 140 collectively include three or more independent antennas to implement a MIMO communication link. However, typically each antenna array 125 and 140 will include two or more antennas for emitting and/or receiving the communication signals 155 that establish the various spatial communication channels of a MIMO communication link. Antenna arrays 125 and 140 may be implemented as RF antennas (e.g., monopole antennas), microwave antennas, optical antennas (e.g., light emitters and photo-detectors), or acoustical antennas (e.g., sonar antennas). However, in each implementation, the antennas are used to establish a MIMO communication link.

Embodiments of the present invention are capable of piggybacking remote sensing off of an active MIMO communication link that is being used to transmit useful data (e.g., communication services such voice, data, video) while simultaneously remote sensing objects within physical environment 110. MIMO TX 115 and MIMO RX 120 may broadcast communication signals 155 according to various wireless communication standards, such as IEEE 802.11n (Wifi), 4G cellular communications (e.g., LTE), 3rd Generation Partnership Project Long Term Evolution, WiMAX, or otherwise. In other embodiments, MIMO TX 115 and MIMO RX 120 may broadcast signals 155 according to proprietary or non-standardized MIMO signaling protocols.

As mentioned above, the spatial information variables are calculated based upon analyzing the MIMO channel matrix. The MIMO channel matrix is generated based upon channel state information ("CSI"). When generated at the receiver, the CSI is often referred to as CSIR. When generated at the transmitter, the CSI is often referred to as CSIT. The MIMO channel matrix may be generated based solely on CSIR, solely on CSIT, or on a combination of both CSIR and CSIT when a feedback data transmission path is available. CSI may take the form of instantaneous CSI by measuring real-time current channel conditions, statistical CSI which measures a statistical characterization of the channel over a longer period of time, or a combination of both. Other non-standardized techniques for obtain channel state information and/or generating the MIMO channel matrix may be used.

MIMO communication signaling exploits the multiple spatial channels available within the channel matrix. In order to optimize the data throughput of the MIMO communication link, a MIMO system preprocesses the transmitted signal and post processes the received signal. This uses knowledge of the channel, as well as various mathematical manipulations on that channel information, as is known in the art. An M×N MIMO communication system has M transmitting elements and N receiving elements. The equation (without including the noise contribution) that describes the time dependency of this system is written as:

$$\vec{y}(t)_{N\times 1} = \sqrt{\frac{1}{2}}\overline{H}(t)_{N\times M}\vec{x}(t)_{M\times 1} \quad \text{(Eq. 1)}$$

where y is the received signal vector, x is the transmitted signal vector, and H is the channel matrix. For simplicity, we focus on the time varying aspect of the channel, which represents an important channel parameter for MIMO remote sensing. The MIMO device (e.g., MIMO TX 115 or MIMO RX 120) generates the channel matrix H by sounding the channel with a preset data pattern to measure channel properties and derive the CSI. The channel sounding is a routine part of a MIMO communication protocol to establish the MIMO communication link and balance the transmit power across the spatial communication channels using the channel matrix H. The MIMO remote sensing technique described herein exploits the channel matrix H for the additional purpose of sensing object 105. During regular operation of a MIMO communication system, the channel matrix H is continuously updated on a periodic basis (e.g., microsecond basis), which provides continuous real-time sensing updates.

Once H is known, a factorization (e.g., singular value decomposition or SVD) can be performed to determine the singular values (e.g., eigenvalues) associated with each of the individual channels (also referred to as eigenchannels). H can be written as, $$\overline{H}_{N\times M} = \overline{U}_{N\times N}\overline{D}_{N\times M}\overline{V}_{M\times M}^* \quad \text{(Eq. 2)}$$

where U and V are unitary matrices, (i.e., VV*=I), and * means the conjugate transpose. From SVD theory, the non-zero diagonal elements of D, when squared, are the eigenvalues of the matrix H*H when N≥M or of the matrix H H* when M≥N.

These eigenvalues are associated with what can be viewed as a spatial communication channel between the transmitter and receiver and indicate how to distribute the power amongst the spatial communication channels in order to maximize the data throughput, or capacity C, using a water-filling technique. The equation for capacity, C is, $$C = \max_{Q:Tr(Q)=P} \log|I_N + \overline{HQH^*}| \quad \text{(Eq. 3)}$$

where Q is the input covariance matrix, and Tr(Q) is the trace of Q. The power allocation for the water-filling strategy is then described as, $$P_i = \left(\mu - \frac{1}{\sigma_i^2}\right)^+, 1 \le i \le \min(M, N) \quad \text{(Eq. 4)}$$

where $\mu$ is the water-fill level, $\sigma_i^2$ is the ith singular value, $P_i$ is the power in the ith eigenmode of the channel, and (x)+ is defined as max(x,0).

For MIMO remote sensing, the capacity C of the MIMO system may be used to observe or measure how H changes over time, as opposed merely to improve data transfer. Thus, at least two properties of H*H (or H H*) may be monitored to remotely sense object 105: (1) the singular values themselves, and/or (2) the channel capacity C. Generically, these properties are referred to herein as spatial information variables. It is also contemplated that the condition number of H*H could provide another measurable property for MIMO remote sensing.

Figure 2:
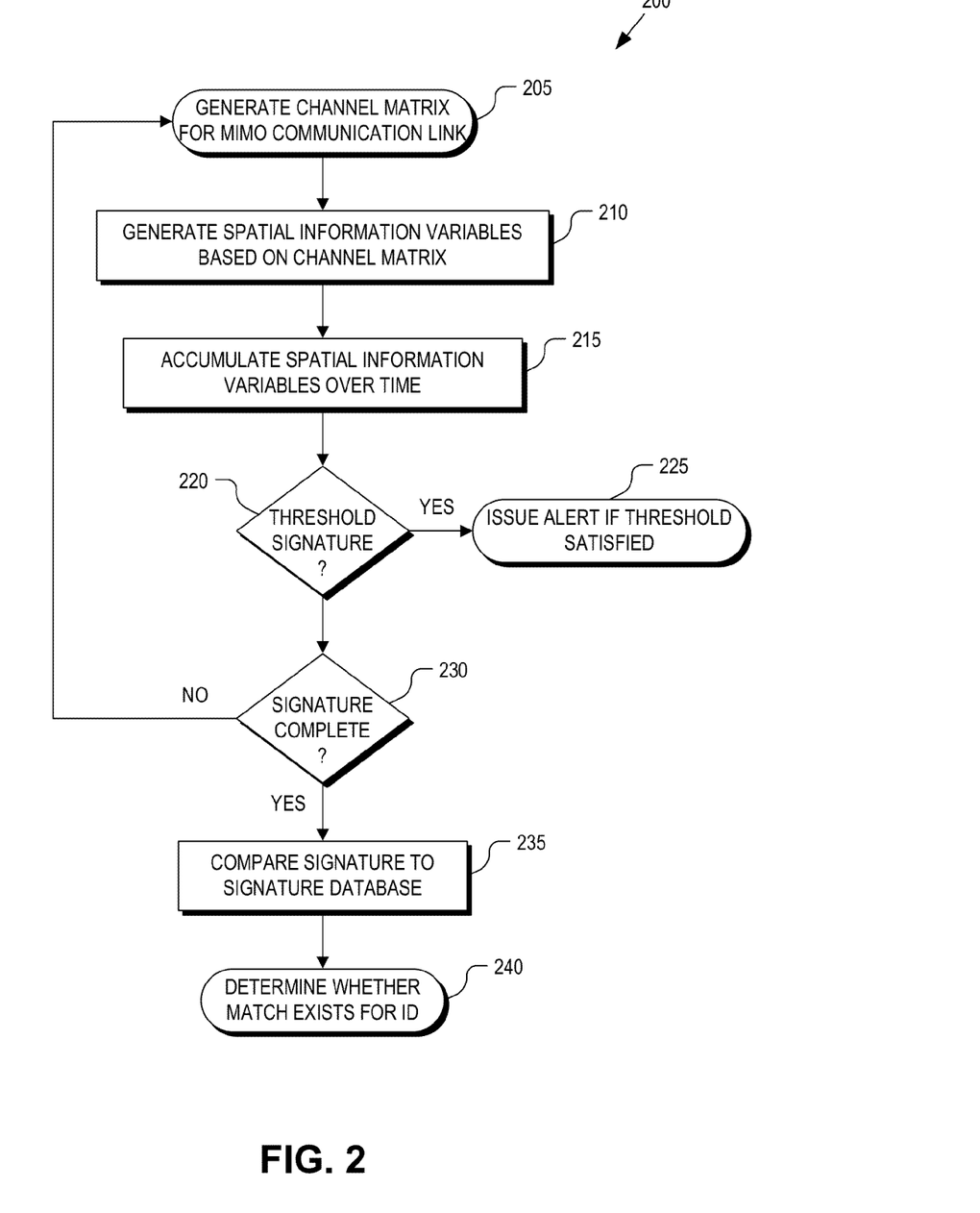
FIG. 2 is a flow chart illustrating a process for MIMO sensing by monitoring spatial information variables derived from the channel matrix of the MIMO communication link, in accordance with an embodiment of the disclosure.

FIG. 2 is a flow chart illustrating a generic process 200 for MIMO sensing by monitoring spatial information variables derived from the channel matrix of the MIMO communication link, in accordance with an embodiment of the disclosure. The order in which some or all of the process blocks appear in process 200 should not be deemed limiting. Rather, one of ordinary skill in the art having the benefit of the present disclosure will understand that some of the process blocks may be executed in a variety of orders not illustrated, or even in parallel.

In a process block 205, the channel matrix H for the MIMO communication link is generated. As described above, the MIMO communication link is made up of multiple spatial communication channels (illustrated in FIG. 1 as dotted lines 155). These spatial communication channels are physically offset or spatially separated. As object 105 passes through these spatially distinct communication channels, it perturbs the individual channels. These perturbations are reflected in real-time in each update of channel matrix H. The channel matrix H can then be analyzed to derive spatial information variables that describe or include spatial information about object 105. Stated another way, the various different physical parts of object 105 will interact with the spatially separated communication channels in a manner that is related to those different physical parts of object 105. Thus, once obtained, the channel matrix H is analyzed to derive spatial information variables that are responsive to the various interactions between the object 105 and the multiple spatially distinct communication channels (process block 210). These spatial information variables may include one or more singular values from a matrix factorization (e.g., eigenvalues from SVD) of channel matrix H, a channel capacity C value calculated based upon the singular values, or values derived from various other filter or weighting algorithms applied to channel matrix H.

It should be appreciated that channel matrix H is continuously updated in real time. Thus, values for the spatial information variables are accumulated over time (process block 215) as a series of temporally derived values to generate a signature or object signature. The object signature is a signature of object 105 as it moves within physical environment 110.

Figure 3A:
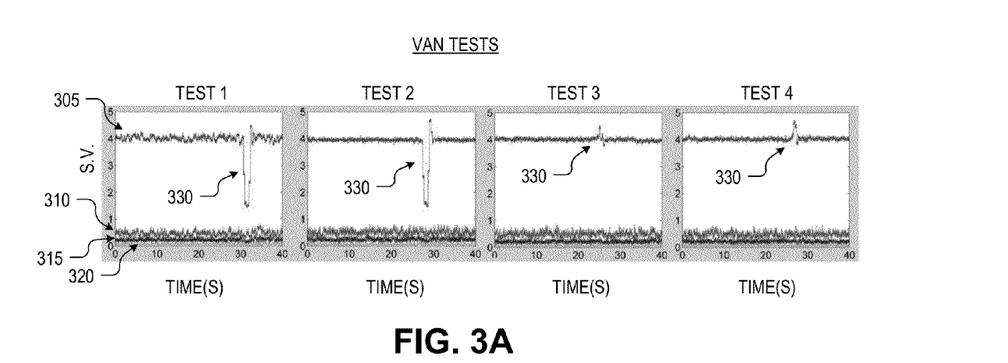
FIGS. 3A-3C illustrate plots of singular value signatures for various different sensed objects moving through a physical environment, in accordance with an embodiment of the disclosure.
Figure 3B:
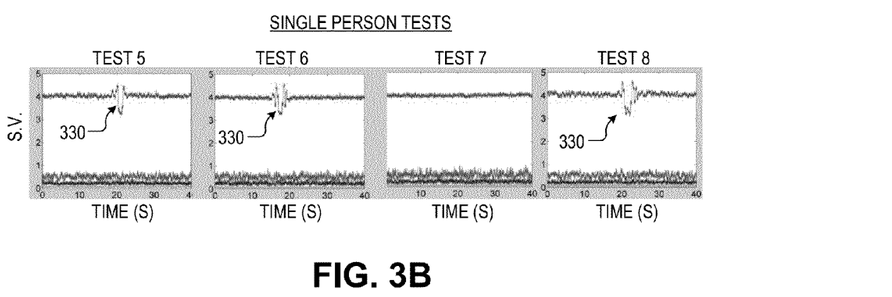
Figure 3C:
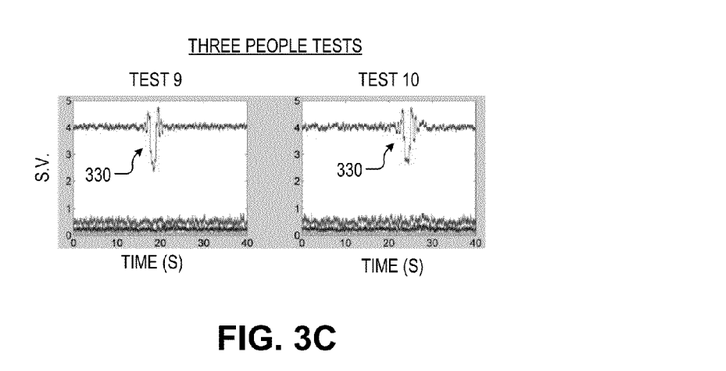

FIGS. 3A, 3B, and 3C illustrate plots of various different signatures obtained from ten different tests using three different object types moving along various different trajectories within physical environment 110. The demonstrative plots use singular values (y axis) from an SVD of the channel matrix H as the spatial information variable being used for MIMO remote sensing. The plots include singular value series of the first order 305, second order 310, third order 315, and fourth order 320. The singular values of the first order 305 illustrate distinctive signatures 330, while the high order singular values series appear less distinctive. However, that is not to say that signatures are not embedded within the noise of those higher order signatures. Rather, appropriate filtering and more sensitive equipment would likely be able to extract useful spatial information from those singular values series as well.

Tests 1 through 4 all represent a van as object 105 moving within physical environment 110. Tests 1 and 2 are of the van moving along trajectory 160 between MIMO TX 115 and MIMO RX 120, while tests 3 and 4 are of the van moving along trajectory 161 behind MIMO RX 120. Tests 5 through 8 all represent a single person as object 105 walking within physical environment 110. Tests 5 and 6 are of the single person walking along trajectory 162 between MIMO TX 115 and MIMO RX 120, while test 7 is of a person walking along trajectory 163 behind MIMO RX 120. Tests 9 and 10 all represent a group of people as object 105 walking within physical environment 110. Tests 9 and 10 are of the group of people walking along trajectory 164 between MIMO TX 115 and MIMO RX 120.

As can been seen, the signatures 330 of the van moving between MIMO TX 115 and MIMO RX 120 are similar, the signatures 330 of the van moving behind MIMO RX 120 are similar, the signatures 330 of the individual person walking between MIMO TX 115 and MIMO RX 120 are similar, and the signatures 330 of the group of people walking between MIMO TX 115 and MIMO RX 120 are similar. Not only do like objects moving along like trajectories produce like signatures 330, but different objects and different trajectories result in different signatures 330. As such, these signatures not only provide spatial information related to the type of object 105 but also provide spatial information of the location and trajectory of object 105. This spatial information, as represented in signatures 330, can be used to remotely sense and identify object 105 using a MIMO communication link. Identifying object 105 may include merely sensing its presence within physical environment 110, sensing its movement within physical environment 110, or even determining what object 105 is (e.g., is object 105 a person, a group of people, a vehicle, a type of vehicle, etc.).

Returning to process 200, a first type of identification may be achievable by thresholding signatures 330 (decision block 220). Thresholding signatures 330 may include an amplitude deviation threshold that is triggered when the spatial information variable deviates (either up or down) from a baseline (e.g., trend line or average value) by a threshold amount. In one embodiment, the threshold deviation must additionally deviate from the baseline for a threshold period of time. If the threshold requirements are satisfied, then an identification alert is issued in process block 225.

In some cases thresholding may not be used (decision block 220), but rather the measured signatures are compared to a known signatures. In this case, once a sufficient number of spatial information variables have been accumulated to acquire a signature (decision block 230), the measured signature is compared to a database of known signatures (process block 235). The known signatures may represent previously measured signatures of known objects moving along known trajectories and cataloged for future reference. Various different types of comparison techniques may be applied; however, in one embodiment, a statistical correlation is used to identify matches with specified confidence intervals. If a statistical correlation to a known signature is found within the database that exceeds a threshold confidence interval, then object 105 is assumed to be identified (process block 240).

Figure 4:
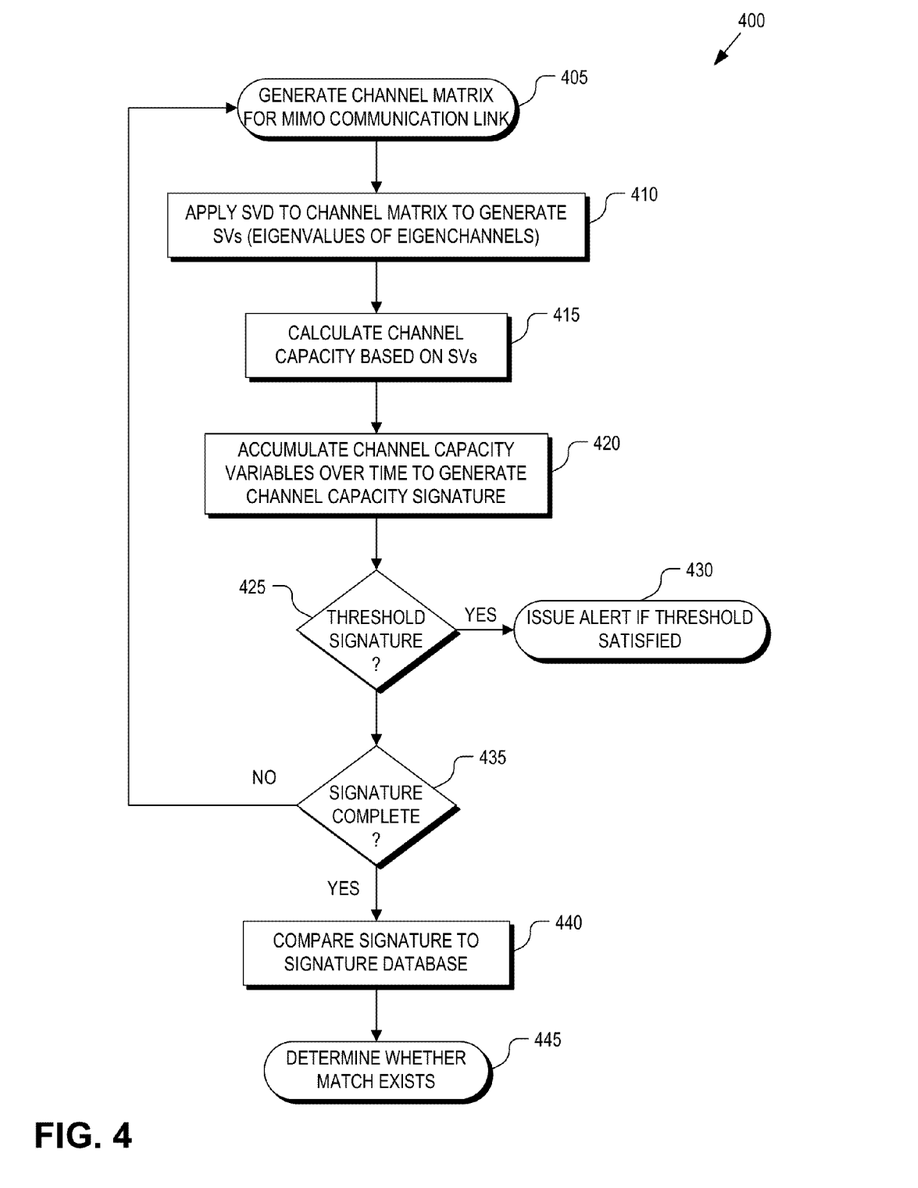
FIG. 4 is a flow chart illustrating a process for MIMO sensing by monitoring channel capacity of the MIMO communication link, in accordance with an embodiment of the disclosure.

FIG. 4 is a flow chart illustrating a process 400 for MIMO sensing by monitoring channel capacity of the MIMO communication link, in accordance with an embodiment of the disclosure. Process 400 operates similar to process 200, but includes additional procedures for deriving the channel capacity from the singular values. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process block 405, the channel matrix H for the MIMO communication link is generated. Once obtained, an SVD is performed to factorize the channel matrix H and derive eigenvalues associated with the eigenchannels of the MIMO communication link (process block 410). The eigenvalues are then inserted into equation (4) to determine the appropriate power levels for each eigenchannel using the water-filling technique. The channel power levels are then inserted into equation (3) to calculate the channel capacity C for a given transmit power level (process block 415). In this embodiment, the channel capacity C is the spatial information variable of interest.

As the channel matrix H is continuously updated in real time, new eigenvalues are continuously derived and a continuous stream of channel capacity values calculated. These are accumulated over time (process block 420) as a series of temporally derived spatial information variable values to generate a signature or object signature based on the channel capacity C. The object signature is a signature of object 105 as it moves within physical environment 110.

If thresholding is performed (decision block 425), then the channel capacity values are thresholding in process block 430. Thresholding the channel capacity values or signature may include an amplitude deviation threshold that is triggered when the channel capacity deviates (either up or down) from a baseline (e.g., trend line or average value) by a threshold amount. In one embodiment, the threshold deviation must additionally deviate from the baseline for a threshold period of time. If the threshold requirements are satisfied, then an identification alert is issued in process block 430.

In some cases thresholding may not be used (decision block 425), but rather the measured signatures are compared to a known signatures. In this case, once a sufficient number of channel capacity values have been accumulated to acquire a signature (decision block 435), the measured signature is compared to a database of known signatures (process block 440). The known signatures may represent previously measured signatures of known objects moving along known trajectories and cataloged for future reference. Various different types of comparison techniques may be applied; however, in one embodiment, a statistical correlation is used to identify matches with specified confidence intervals. If a statistical correlation is found to exceed a threshold confidence interval, then object 105 is assumed to be identified (process block 445).

The channel capacity described in equation (3), assumes that some level of channel state is known both at the transmitter and at the receiver. This capacity is not always achievable in a practical sense. However, this measure has the advantage for mixing different amounts of multipath spatial information together into a single variable through setting the average transmitted power level and maximizing equation (3) through water-filling as described by equation (4). By setting $\mu$ to a low level only one eigenchannel will be used. Correspondingly, by raising the average power level, an increasing number of eigenchannels will be used in the capacity expression thereby potentially including additional spatial information into the channel capacity value. This is akin to analyzing more than just the dominant singular value series 305, but also analyzing the higher order singular value series 310, 315, and 320. How many orders are included is selectable via appropriate control of average transmit power. Below a threshold transmit power, MIMO TX 115 substantially only powers the dominate eigenchannel; however, beyond the threshold level, the transmitter will start diverting power to the non-dominant eigenchannels (i.e., the higher order eigenchannels). For the non-dominant eigenchannels to have meaningful spatial information, the signal-to-noise-ratio ("SNR") of those channels must be sufficiently high so that the useful spatial information is not drowned out by the background noise. Of course, a combination of channel capacity and singular values may be used together as spatial information variables to identify object 105.

Figure 5:
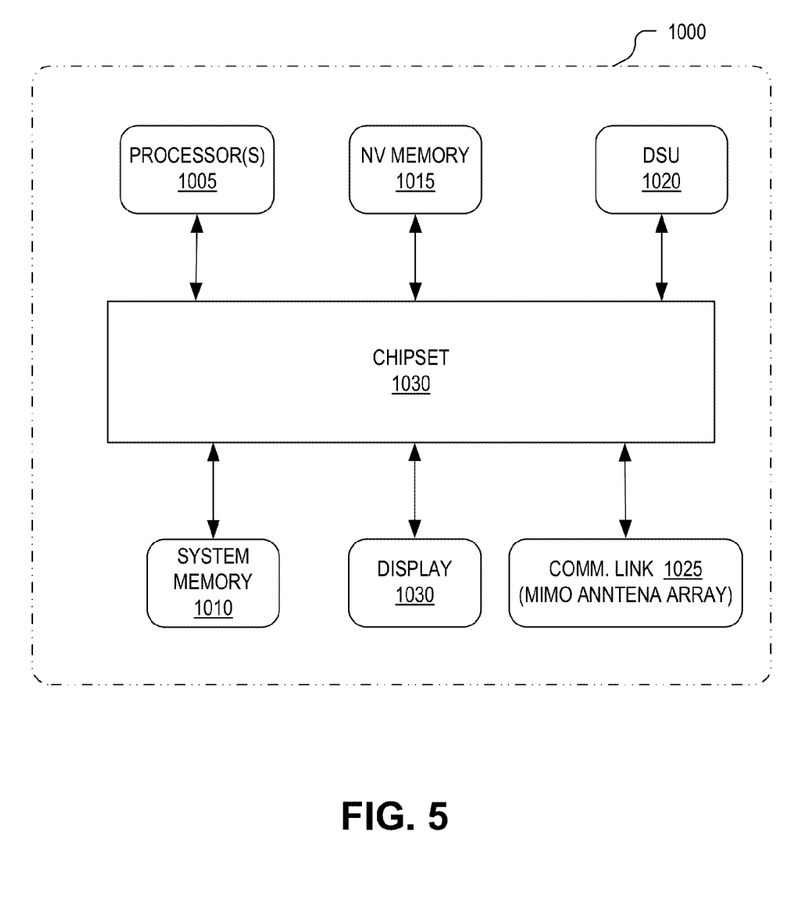
FIG. 5 is a functional block diagram illustrating a demonstrative processing system for implementing embodiments of the MIMO sensing technique disclosed herein.

FIG. 5 is a block diagram illustrating a demonstrative processing system 500 for implementing either of processing systems 135 or 150 and executing any or all of processes 200 or 400. The illustrated embodiment of processing system 500 includes one or more processors (or central processing units) 505, system memory 510, nonvolatile ("NV") memory 515, a data storage unit ("DSU") 520, a communication interface 525, and a chipset 530. The illustrated processing system 500 may represent a variety of computing system including a desktop computer, a notebook computer, a workstation, a handheld computer, a server, a blade server, an intelligent wireless access point, or otherwise.

The elements of processing system 500 are interconnected as follows. Processor(s) 505 is communicatively coupled to system memory 510, NV memory 515, DSU 520, and communication interface 525, via chipset 530 to send and to receive instructions or data thereto/therefrom. In one embodiment, NV memory 515 is a flash memory device. In other embodiments, NV memory 515 includes any one of read only memory ("ROM"), programmable ROM, erasable programmable ROM, electrically erasable programmable ROM, or the like. In one embodiment, system memory 510 includes random access memory ("RAM"), such as dynamic RAM ("DRAM"), synchronous DRAM, ("SDRAM"), double data rate SDRAM ("DDR SDRAM"), static RAM ("SRAM"), or the like. DSU 520 represents any storage device for software data, applications, and/or operating systems, but will most typically be a nonvolatile storage device. DSU 520 may optionally include one or more of an integrated drive electronic ("IDE") hard disk, an enhanced IDE ("EIDE") hard disk, a redundant array of independent disks ("RAID"), a small computer system interface ("SCSI") hard disk, or the like. Although DSU 520 is illustrated as internal to processing system 500, DSU 520 may be externally coupled to processing system 500. Communication interface 525 may couple processing system 500 to a network or communication link such that processing system 500 may communicate over the network/communication link with one or more other computing devices. Communication interface 525 may couple to a MIMO antenna array (e.g., wireless antenna array, optical antenna array, acoustical antenna array, etc.) to establish a MIMO communication link with a remote MIMO antenna array. Communication interface 525 may an Ethernet card, a Gigabit Ethernet card, Universal Serial Bus ("USB") port, a wireless network interface card, a fiber optic interface, or the otherwise.

It should be appreciated that various other elements of processing system 500 have been excluded from FIG. 5 and this discussion for the purposes of clarity. For example, processing system 500 may further include a graphics card for rendering images to a screen, additional DSUs, other persistent data storage devices (e.g., tape drive), or the like. Chipset 530 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 530. Correspondingly, processing system 500 may operate without one or more of the elements illustrated. For example, processing system 500 need not include DSU 520.

The processes explained above are described in terms of computer software and hardware. The techniques described may constitute machine-executable instructions embodied within a tangible or non-transitory machine (e.g., computer)

readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of sensing a moving object within a physical environment, the method comprising:
   generating a channel matrix based upon channel state information of a multiple-input and multiple-output ("MIMO") communication link, wherein the physical environment operates as a communication medium through which communication signals of the MIMO communication link propagate between a transmitter and a receiver having multiple antennas;
   generating a spatial information variable for the MIMO communication link based on the channel matrix, wherein the spatial information variable includes spatial information about the moving object within the physical environment, wherein generating the spatial information variable comprises factorizing the channel matrix to obtain singular values, wherein the spatial information variable comprises a channel capacity variable calculated based upon the singular values, and wherein the channel capacity variable is a measure of available channel throughput of the MIMO communication link between the transmitter and the receiver for a given transmit power level;
   generating a signature for the moving object based on values of the spatial information variable accumulated over time; and
   identifying the moving object within physical environment based upon the signature.

2. The method of claim 1, wherein the MIMO communication link includes multiple spatial communication channels between the transmitter and the receiver and wherein the spatial information variable is responsive to interactions between the moving object and one or more of the multiple spatial communication channels such that the moving object becomes part of the communication medium.

3. The method of claim 2, wherein the moving object interacts with one or more of the multiple spatial communication channels by one or more of creating a new spatial communication channel, attenuating an existing spatial communication channel, or enhancing the existing spatial communication channel.

4. The method claim 1, wherein the spatial information variable comprises one of the singular values, and wherein factorizing the channel matrix comprises performing a singular value decomposition on the channel matrix to obtain eigenvalues associated with eigenchannels of the MIMO communication link.

5. The method of claim 1, wherein identifying the moving object comprises statistically correlating the signature to a database of known signatures.

6. The method of claim 5, wherein the know signatures comprise one of a temporal series of eigenvalues or a temporal series of channel capacity values.

7. The method of claim 1, wherein identifying the moving object comprises:
   thresholding one or both of a duration of the signature or an amplitude of the signature.

8. The method of claim 2, further comprising:
   applying weighting values to components of the channel matrix to enhance a sensing contribution from a first one of the multiple spatial communication channels while reducing a sensing contribution from a second one of the multiple spatial communication channels.

9. The method of claim 1, wherein the MIMO communication link comprises a standards based wireless communication link.

10. The method of claim 9, wherein the transmitter comprises a first transceiver and the receiver comprises a second transceiver and wherein the MIMO communication link actively communicates data between the first and second transceivers while the channel matrix associated with the MIMO communication link is analyzed to sense the moving object.

11. The method of claim 1, wherein the spatial information about the moving object includes information related to one or more of a size of the object, a shape of the object, or a matter composition distribution of the object.

12. The method of claim 1, wherein the MIMO communication link comprises one of an optical MIMO communication link or an acoustical MIMO communication link.

13. At least one non-transitory machine-accessible storage medium that provides instructions that, when executed by a machine, will cause the machine to perform operations comprising:
   generating a channel matrix based upon channel state information of a multiple-input and multiple-output ("MIMO") communication link, wherein a physical environment operates as a communication medium through which communication signals of the MIMO communication link propagate between a transmitter and a receiver having multiple antennas;
   generating a spatial information variable for the MIMO communication link based on the channel matrix, wherein the spatial information variable includes spatial information about the moving object within the physical environment, wherein generating the spatial information variable comprises factorizing the channel matrix to obtain singular values, wherein the spatial information variable comprises a channel capacity variable calculated based upon the singular values, and wherein the channel capacity variable is a measure of available channel throughput of the MIMO communication link between the transmitter and the receiver for a given transmit power level;

generating a signature for the moving object based on values of the spatial information variable accumulated over time; and identifying the moving object within physical environment based upon the signature.

14. The machine-accessible storage medium of claim 13, wherein the MIMO communication link includes multiple spatial communication channels between the transmitter and the receiver and wherein the spatial information variable is responsive to interactions between the moving object and one or more of the multiple spatial communication channels such that the moving object becomes part of the communication medium.

15. The machine-accessible storage medium of claim 14, wherein the moving object interacts with one or more of the multiple spatial communication channels by one or more of creating a new spatial communication channel, attenuating an existing spatial communication channel, or enhancing the existing spatial communication channel.

16. The machine-accessible storage medium of claim 13, wherein identifying the moving object comprises statistically correlating the signature to a database of known signatures.

17. The machine-accessible storage medium of claim 13, wherein the MIMO communication link comprises a standards based wireless communication link.

18. The machine-accessible storage medium of claim 13, wherein the spatial information about the moving object includes information related to one or more of a size of the object, a shape of the object, or a matter composition distribution of the object.

19. A multiple-input and multiple-output ("MIMO") communication system capable of conveying data through a physical environment that operates as a communication medium while sensing a moving object within the physical environment, the MIMO communication system comprising:

a MIMO transmitter coupled to a first array of antennas;

a MIMO receiver coupled to a second array of antennas; and a processing system communicatively coupled to one or both of the MIMO transmitter or receiver, the processing system including logic to perform operations comprising:

generating a channel matrix based upon channel state information of a MIMO communication link between the MIMO transmitter and receiver, wherein communication signals of the MIMO communication link propagate through the physical environment between the MIMO transmitter and receiver;

generating a spatial information variable for the MIMO communication link based on the channel matrix, wherein the spatial information variable includes spatial information about the moving object within the physical environment, wherein generating the spatial information variable comprises factorizing the channel matrix to obtain singular values, wherein the spatial information variable comprises a channel capacity variable calculated based upon the singular values, and wherein the channel capacity variable is a measure of available channel throughput of the MIMO communication link between the transmitter and the receiver for a given transmit power level;

generating a signature for the moving object based on values of the spatial information variable accumulated over time; and identifying the moving object within physical environment based upon the signature.

20. The MIMO communication system of claim 19, wherein the MIMO communication link includes multiple spatial communication channels between the transmitter and the receiver and wherein the spatial information variable is responsive to interactions between the moving object and one or more of the multiple spatial communication channels such that the moving object becomes part of the communication medium.

21. The MIMO communication system of claim 19, wherein identifying the moving object comprises statistically correlating the signature to a database of known signatures.

22. The MIMO communication system of claim 19, wherein the spatial information about the moving object includes information related to one or more of a size of the object, a shape of the object, or a matter composition distribution of the object.

* * * * *